US012392971B2

(12) United States Patent
Fu et al.

(10) Patent No.: US 12,392,971 B2
(45) Date of Patent: Aug. 19, 2025

(54) OPTICAL EMISSION ASSEMBLY AND OPTICAL MODULE

(71) Applicants: DONGGUAN XUNTAO ELECTRONIC CO., LTD., Dongguan (CN); Dongguan Luxshare Technologies Co., Ltd, Dongguan (CN)

(72) Inventors: Chung-Hsin Fu, Taipei (TW); Min-Sheng Kao, Taipei (TW); Yi-Tseng Lin, Taipei (TW); Chih-Wei Yu, Taipei (TW)

(73) Assignees: DONGGUAN XUNTAO ELECTRONIC CO., LTD., Dongguan (CN); DONGGUAN LUXSHARE TECHNOLOGIES CO., LTD., Dongguan (CN)

( * ) Notice: Subject to any disclaimer, the term of this patent is extended or adjusted under 35 U.S.C. 154(b) by 320 days.

(21) Appl. No.: 18/205,093

(22) Filed: Jun. 2, 2023

(65) Prior Publication Data
US 2024/0210639 A1    Jun. 27, 2024

(30) Foreign Application Priority Data
Dec. 26, 2022    (CN) .......................... 202211671154.4

(51) Int. Cl.
*G02B 6/42*    (2006.01)
*G02B 6/43*    (2006.01)

(52) U.S. Cl.
CPC ......... *G02B 6/4268* (2013.01); *G02B 6/4214* (2013.01); *G02B 6/4266* (2013.01);
(Continued)

(58) Field of Classification Search
CPC .. G02B 6/4268; G02B 6/4214; G02B 6/4266; G02B 6/4272; G02B 6/428; G02B 6/43; G02B 6/4204; G02B 6/4269
See application file for complete search history.

(56) References Cited

U.S. PATENT DOCUMENTS 10,884,201 B2 *  1/2021  Liu ..................... G02B 6/3839
11,561,351 B2 *  1/2023  Sun ....................... G02B 6/428
(Continued)

FOREIGN PATENT DOCUMENTS

CN    110658599 A  *  1/2020  ........... G02B 6/4269
CN    106990489 B  *  6/2020  .......... H04J 14/0307
(Continued)

Primary Examiner — Michelle R Connelly
(74) Attorney, Agent, or Firm — Birch, Stewart, Kolasch & Birch, LLP

(57) ABSTRACT

Disclosed is an optical emission assembly including a heat dissipation base, an adapter, a light-emitting assembly, a multiplexer, a cooling chip, a converging lens, a housing, and a heat-conducting glue. The heat dissipation base includes a first heat dissipation plate and a second heat dissipation plate forming a T-shaped or an L-shaped structure. The light-emitting assembly and the multiplexer are disposed on the second heat dissipation plate. The multiplexer combines light beams emitted by light-emitting chips of the light-emitting assembly into one light beam, and then the one light beam enters the adapter through the converging lens. The cooling chip is disposed on the first heat dissipation plate. The heat dissipation base and the cooling chip are disposed in the housing, and the cooling chip corresponds to a through hole of the housing. The heat-conducting glue is filled in the through hole and between the cooling chip and the housing.

20 Claims, 14 Drawing Sheets

(52) U.S. Cl.
 CPC ........... *G02B 6/4272* (2013.01); *G02B 6/428* (2013.01); *G02B 6/43* (2013.01); *G02B 6/4204* (2013.01)

(56) References Cited

U.S. PATENT DOCUMENTS

| | | | |
|---|---|---|---|
| 11,616,575 B2 * | 3/2023 | Li | H04J 14/0305 |
| | | | 250/216 |
| 11,994,726 B2 * | 5/2024 | Zhang | G02B 6/4292 |
| 12,013,583 B2 * | 6/2024 | Wang | G02B 6/4246 |
| 12,092,881 B2 * | 9/2024 | Sun | G02B 6/4269 |
| 12,235,497 B2 * | 2/2025 | Zhang | G02B 6/4246 |
| 12,313,892 B2 * | 5/2025 | Lin | H01S 5/023 |
| 2009/0067849 A1 * | 3/2009 | Oki | H01R 13/6585 |
| | | | 398/136 |
| 2018/0139520 A1 * | 5/2018 | Xiao | G02B 6/29365 |
| 2018/0172928 A1 * | 6/2018 | Ho | G02B 6/4246 |
| 2020/0014484 A1 * | 1/2020 | Chen | H04B 10/2589 |
| 2020/0091677 A1 | 3/2020 | Dede et al. | |
| 2021/0055487 A1 * | 2/2021 | Zhai | G02B 6/4215 |
| 2023/0258883 A1 * | 8/2023 | Zhang | G02B 6/4284 |
| | | | 385/15 |
| 2024/0210635 A1 * | 6/2024 | Fu | G02B 6/4214 |

FOREIGN PATENT DOCUMENTS

| | | | | |
|---|---|---|---|---|
| CN | 113589454 B | * | 12/2021 | ........... G02B 6/4277 |
| JP | 7030417 B2 | * | 3/2022 | ......... H01S 5/02469 |
| TW | M331083 U | | 4/2008 | |
| TW | M445674 U1 | | 1/2013 | |
| WO | WO 2013/135517 A1 | | 9/2013 | |
| WO | WO-2019089987 A1 | * | 5/2019 | ........... H04B 10/503 |

\* cited by examiner

OPTICAL EMISSION ASSEMBLY AND OPTICAL MODULE

CROSS REFERENCE TO RELATED APPLICATION

This application claims the priority benefit of Chinese Patent Application Serial Number 202211671154.4, filed on Dec. 26, 2022, the full disclosure of which is incorporated herein by reference.

BACKGROUND

Technical Field

The present disclosure relates to the technical field of communications, and in particular, to an optical emission assembly and an optical module.

Related Art

In modern communication systems, the demand for network traffic increases very rapidly. Therefore, fiber broadband has gradually become the mainstream to make optical modules very important. Existing optical modules usually use wavelength division multiplexing (WDM) technology, which combines multiple light beams emitted by multiple light-emitting chips disposed on the same plane in an optical emission assembly into one light beam to accommodate more optical signals in a single fiber optic cable, to increase the amount of transmission of the optical signal in the fiber optic cable, so as to increase the transmission capacity of information.

However, in the design that multiple light-emitting chips are disposed on the same plane, the heat energy generated by the multiple light-emitting chips may not be effectively dissipated through the supporting base, which results in the problem of shortening the service life of the light-emitting chip.

Therefore, how to provide a scheme that solves the above-mentioned technical problem is the problem that those skilled in the art need to solve at present.

SUMMARY

The present disclosure provides an optical emission assembly and an optical module, which can solve the problem of shortening the service life of the light-emitting chip since the heat energy generated by the multiple light-emitting chips may not be effectively dissipated through the supporting base in the design that the multiple light-emitting chips of the existing optical emission assembly are disposed on the same plane.

In order to solve the above technical problem, the present disclosure is implemented as follows.

The present disclosure provides an optical emission assembly, which includes a heat dissipation base, a converging lens, an adapter, a light-emitting assembly, a multiplexer, a cooling chip, a heat-conducting housing and a heat-conducting glue. The heat dissipation base includes a heat dissipation body, and a first heat dissipation plate and a second heat dissipation plate extending from the heat dissipation body along a first direction. The first heat dissipation plate and the second heat dissipation plate form a T-shaped structure or an L-shaped structure. Two adjacent sides of the second heat dissipation plate are respectively connected to a surface of the heat dissipation body and a surface of the first heat dissipation plate, and the heat dissipation body is provided with a through hole along the first direction. The converging lens is disposed in the through hole of the heat dissipation body. One end of the adapter is inserted into the through hole of the heat dissipation body. The light-emitting assembly is disposed on the second heat dissipation plate, and includes a plurality of light-emitting chips. The multiplexer is disposed on the second heat dissipation plate, located between the plurality of light-emitting chips and the converging lens, and configured to combine light beams emitted by the plurality of light-emitting chips into one light beam, and make the one light beam converge to the adapter through the converging lens. The cooling chip is disposed on a surface of the first heat dissipation plate opposite to the surface of the first heat dissipation plate connected to the second heat dissipation plate. One end of the heat-conducting housing is provided with a first through hole along the first direction and a second through hole along a second direction, and the first direction and the second direction are perpendicular to each other. The heat dissipation base, a plurality of light-emitting chips, the multiplexer and the cooling chip are disposed in the heat-conducting housing, the adapter extends out of the heat-conducting housing through the first through hole, and the cooling chip is disposed corresponding to the second through hole. The heat-conducting glue is filled in the second through hole and between the cooling chip and the heat-conducting housing, so as to make the cooling chip thermally connect to the heat-conducting housing.

The present disclosure provides an optical module, which includes an optical reception assembly and an optical emission assembly of the present disclosure.

In the embodiment of the optical emission assembly of the present disclosure, the first heat dissipation plate and the second heat dissipation plate form a T-shaped structure or an L-shaped structure, the light-emitting chips and devices associated with the optical paths of the light-emitting chips are disposed on the second heat dissipation plate, and the cooling chip is disposed on a surface of the first heat dissipation plate opposite to the surface of the first heat dissipation plate connected to the second heat dissipation plate, so that the heat energy generated by multiple light-emitting chips disposed on the same plane can be effectively dissipated by the cooling chip on the heat dissipation base through the heat-conducting housing.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
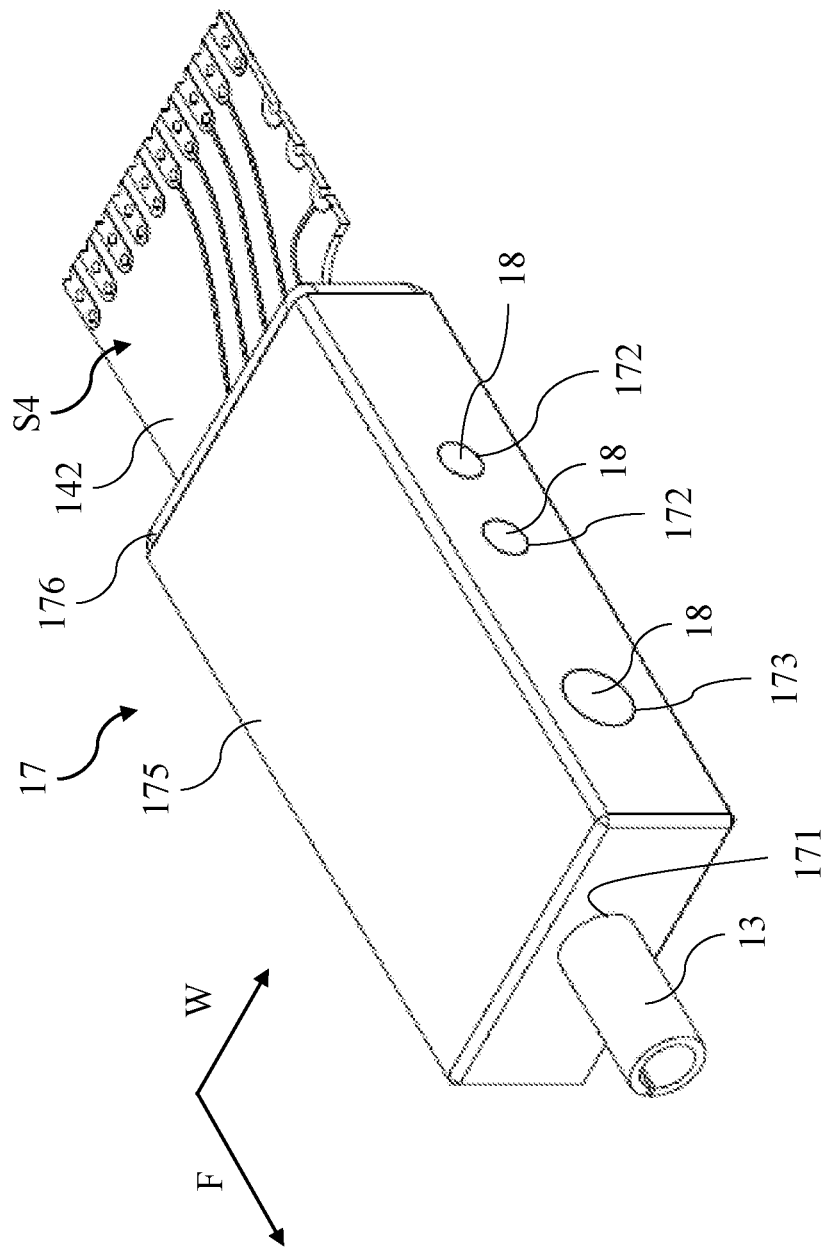
FIG. 1 is a schematic stereoscopic diagram of an optical emission assembly according to an embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to".

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In the following embodiment, the same reference numerals are used to refer to the same or similar elements throughout the disclosure.

Figure 2:
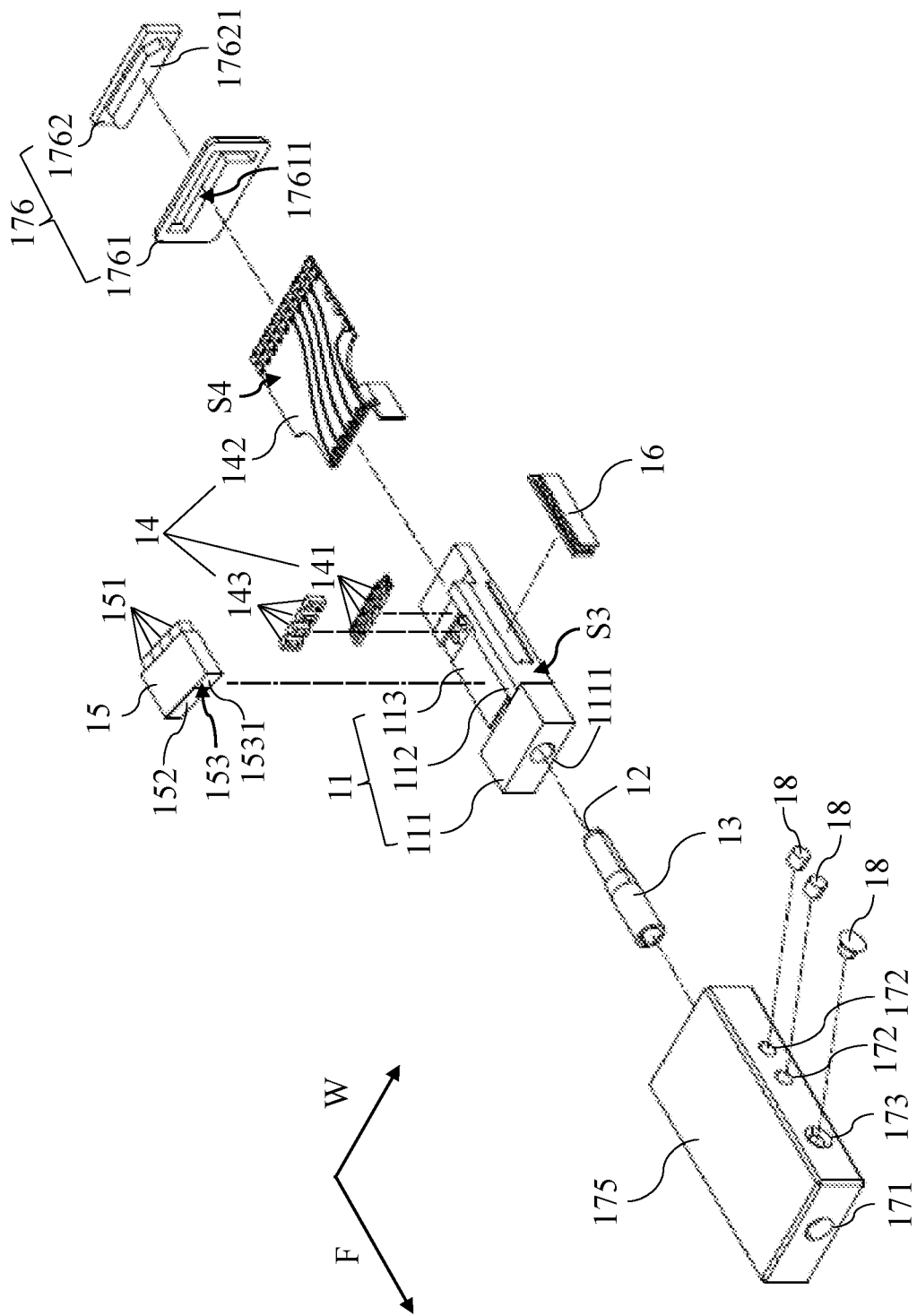
FIG. 2 is a schematic exploded diagram of a first viewing angle of the optical emission assembly of FIG. 1.
Figure 3:
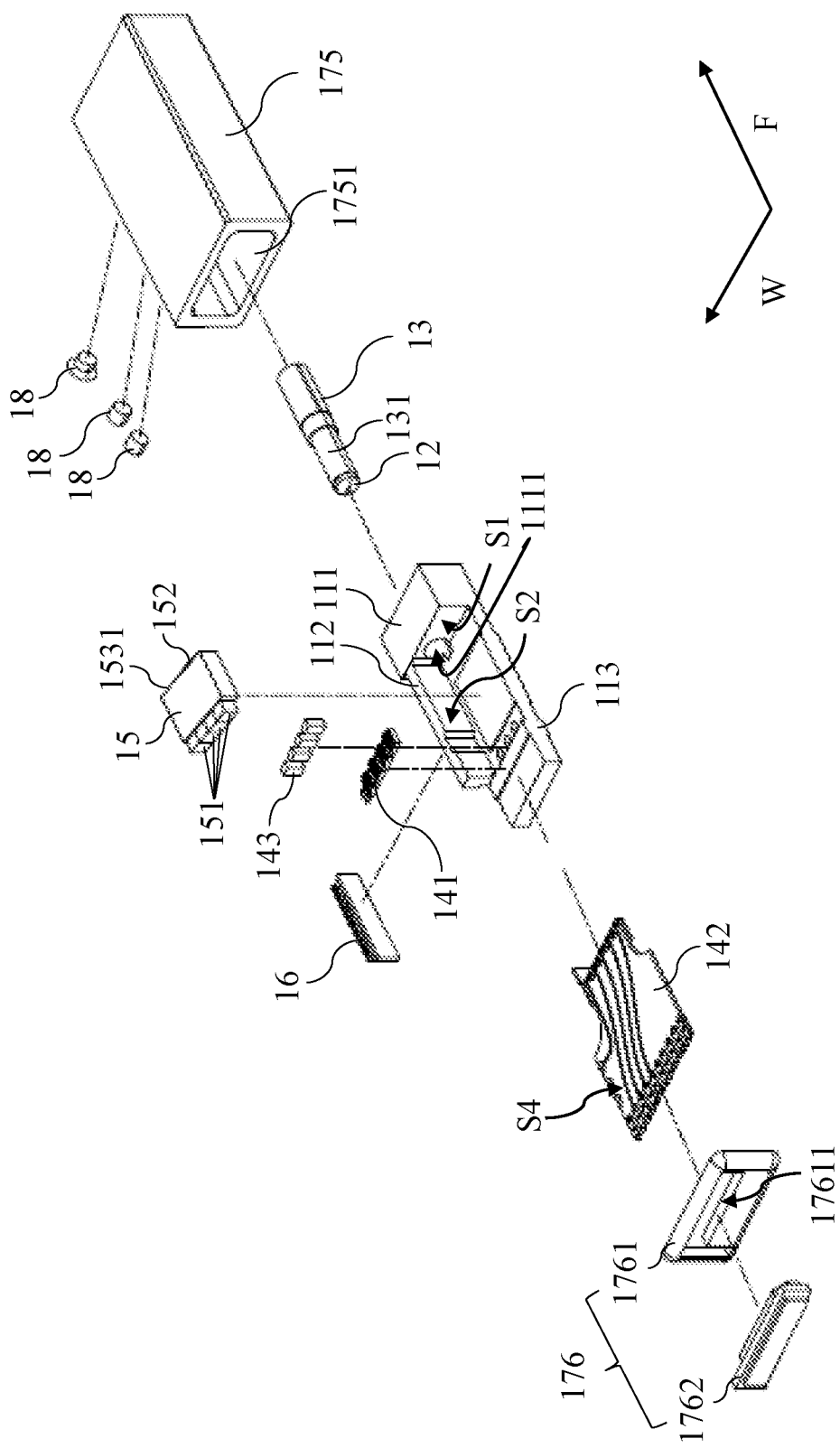
FIG. 3 is a schematic exploded diagram of a second viewing angle of the optical emission assembly of FIG. 1.
Figure 4:
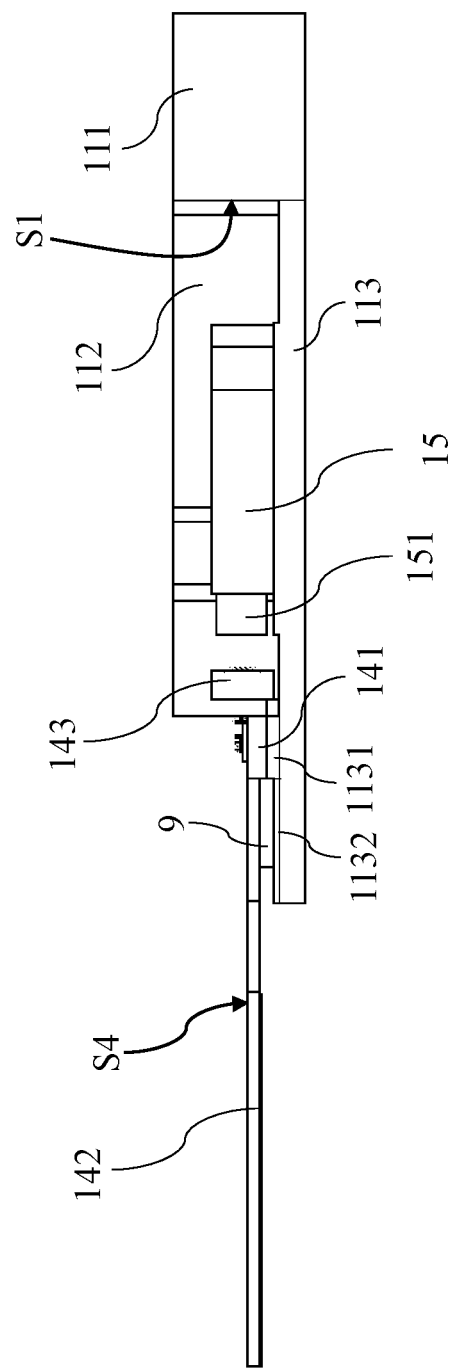
FIG. 4 is a combined side view of the heat dissipation base, the light-emitting assembly, and the multiplexer of FIG. 1.

Please refer to FIG. 1 to FIG. 4, wherein FIG. 1 is a schematic stereoscopic diagram of an optical emission assembly according to an embodiment of the present disclosure, FIG. 2 is a schematic exploded diagram of a first viewing angle of the optical emission assembly of FIG. 1, FIG. 3 is a schematic exploded diagram of a second viewing angle of the optical emission assembly of FIG. 1, and FIG. 4 is a combined side view of the heat dissipation base, the light-emitting assembly, and the multiplexer of FIG. 1. As shown in FIG. 1 to FIG. 4, an optical emission assembly 1 comprises a heat dissipation base 11, a converging lens 12, an adapter 13, a light-emitting assembly 14, a multiplexer 15, a cooling chip 16, a heat-conducting housing 17 and a heat-conducting glue 18. The heat dissipation base 11 comprises a heat dissipation body 111, and a first heat dissipation plate 112 and a second heat dissipation plate 113 extending from the heat dissipation body 111 along a first direction F. The first heat dissipation plate 112 and the second heat dissipation plate 113 form a T-shaped structure or an L-shaped structure, two adjacent sides of the second heat dissipation plate 113 are respectively connected to the surface S1 of the heat dissipation body 111 and the surface S2 of the first heat dissipation plate 112, and the heat dissipation body 111 is provided with a through hole 1111 along the first direction F. In this embodiment, the first heat dissipation plate 112 and the second heat dissipation plate 113 form an L-shaped structure. The heat dissipation body 111, the first heat dissipation plate 112 and the second heat dissipation plate 113 can be integrally formed. The material of the heat dissipation base 11 can be a metal material or an alloy material, so that the heat dissipation base 11 has good heat conduction characteristics. Specifically, the material of the heat dissipation base 11 can be made of one or more combinations of gold, aluminum, copper, platinum, titanium, and chromium; however, this embodiment is not intended to limit the present disclosure.

In this embodiment, the converging lens 12 is disposed in the through hole 1111. One end of the adapter 13 is inserted in the through hole 1111, and the adapter 13 can be but not limited to a single-mode adapter. The light-emitting assembly 14 is disposed on the second heat dissipation plate 113, and comprises a plurality of light-emitting chips 141, the number of light-emitting chips 141 can be but not limited to four, the wavelengths of the light beams emitted by the light-emitting chips 141 are different, the light-emitting chip 141 can be but not limited to a laser chip, and the light-emitting chip 141 is configured to emit light beams toward the heat dissipation body 111. The multiplexer 15 is disposed on the second heat dissipation plate 113, is located between the four light-emitting chips 141 and the converging lens 12, and is configured to combine the light beams emitted by the four light-emitting chips 141 into one light beam (that is, four light beams of different wavelengths are combined into the one light beam), and the one light beam is converged to the adapter 13 through the converging lens 12.

In this embodiment, the cooling chip 16 is disposed on the surface S3 of the first heat dissipation plate 112 opposite to the surface of the first heat dissipation plate 112 connected to the second heat dissipation plate 113. One end of the heat-conducting housing 17 is provided with a first through hole 171 along the first direction F and a second through hole 172 along the second direction W, the number of the second through hole 172 can be but not limited to two, and the first direction F and the second direction W are perpendicular to each other. The heat dissipation base 11, the plurality of light-emitting chips 141, the multiplexer 15 and the cooling chip 16 are disposed in the heat-conducting housing 17, the adapter 13 extends out of the heat-conducting housing 17 through the first through hole 171 (that is, the through hole 1111 corresponds to the first through hole 171), and the cooling chip 16 is disposed corresponding to the second through hole 172. The heat-conducting glue 18 is filled in the second through hole 172 and between the cooling chip 16 and the heat-conducting housing 17, so that the cooling chip 16 and the heat-conducting housing 17 are thermally connected.

It should be noted that the heat dissipation base 11 and the heat-conducting housing in this embodiment are only substantially connected by the cooling chip 16 and the heat-conducting housing glue 18, but this embodiment is not intended to limit the present disclosure. In addition, in order to increase the heat conduction between the heat dissipation base 11 and the heat-conducting housing 17, the heat-conducting housing 17 can further be provided with a third through hole 173 along the second direction W, and the heat dissipation body 111 is disposed corresponding to the third through hole 173. The heat-conducting glue 18 can further be filled in the third through hole 173 and between the heat dissipation body 111 and the heat-conducting housing 17, so that the heat dissipation body 111 and the heat-conducting housing 17 are thermally connected.

Therefore, the optical emission assembly 1 of this embodiment realizes four-channel optical transmission, and the heat energy generated by the four light-emitting chips 141 can be dissipated through the second heat dissipation plate 113, the first heat dissipation plate 112, the cooling chip 16, and the heat-conducting housing 17, which solves the heat dissipation problem existing in the prior art. Besides, by the arrangement of the heat-conducting housing 17, in addition to helping the four light-emitting chips 141 to dissipate heat, it can also protect the heat dissipation base 11, the four light-emitting chips 141, the multiplexer 15 and the cooling chip 16 to prevent water vapor and/or dust from entering the inside of the heat-conducting housing 17, and affecting the functions of the light-emitting chips 141, the multiplexer 15 and the cooling chip 16.

In one embodiment, the adapter 13 can comprise a sleeve 131, the converging lens 12 is disposed in the sleeve 131, the sleeve 131 is inserted into the through hole 1111 (that is, one end of the adapter 13 is inserted into the through hole 1111, and the other end of the adapter 13 protrudes from the outer surface of the heat dissipation body 111), and the adapter 13 can be but not limited to a single-mode adapter. In addition, the adapter 13 may further comprise other necessary components such as optic fiber ferrules, which will not be described here.

In one embodiment, the light-emitting assembly 14 may further comprise a circuit board 142, and the circuit board 142 is electrically connected to the plurality of light-emitting chips 141 and extends toward the first direction F. The other end of the heat-conducting housing 17 is provided with an opening along the first direction F, and the circuit board 142 extends out of the heat-conducting housing 17 through the opening, so as to receive electrical signals from the outside for driving the plurality of light emitting chips 141 to emit light beams, and transmit the electrical signals to the plurality of light emitting chips 141.

In one embodiment, the heat-conducting housing 17 may comprise a hood body 175 and a cover body 176, and the cover body 176 covers the opening 1751 of the hood body 175 to form an accommodation space. The heat dissipation base 11, the plurality of light-emitting chips 141, the multiplexer 15 and the cooling chip 16 are disposed in the accommodation space. The cover body 176 is provided with the opening through which the circuit board 142 extends out of the heat-conducting housing 17, and the hood body 175 is provided with a first through hole 171 and a second through hole 172. The cover body 176 may comprise a first cover shell 1761 and a second cover shell 1762, and the gap 17611 of the first cover shell 1761 and the protrusion 17621 of the second cover shell 1762 cooperate to form the opening along the first direction F (that is, the opening where the circuit board 142 extends out of the heat-conducting housing 17) for clamping the circuit board 142.

In one embodiment, the light-emitting assembly 14 can further comprise a plurality of collimating lenses 143 disposed on the second heat dissipation plate 113, and the plurality of light-emitting chips 141 are disposed in one-to-one correspondence with the plurality of collimating lenses 143 (i.e., the number of light-emitting chips 141 is equal to the number of collimating lenses 143), and the light beams emitted by each light-emitting chip 141 enter the multiplexer 15 through the corresponding collimating lens 143. The collimating lens 143 and the light-emitting chip 141 corresponding thereto can be assembled by adopting the active alignment technology or passive alignment technology.

In one embodiment, the second heat dissipation plate 113 can be provided with a first carrier 1131 and a second carrier 1132, the first carrier 1131 carries the plurality of light-emitting chips 141, and the second carrier 1132 carries the circuit board 142. The height of the first carrier 1131 is greater than the height of the second carrier 1132, and the plurality of light-emitting chips 141 and the surface S4 of the circuit board 142 electrically connected with the plurality of light-emitting chips 141 are located at the same height, as shown in FIG. 4. The first carrier 1131 and the second carrier 1132 can form a stepped structure. The circuit board 142 is attached to the second carrier 1132 through the glue 9, such as the thermally conductive glue, so that the plurality of light-emitting chips 141 and the surface S4 of the circuit board 142 electrically connected with the plurality of light-emitting chips 141 are located at the same height, which is beneficial to wire bonding and shortens the length of wire bonding. The circuit board 142 can be, but not limited to, a printed circuit board (PCB), a flexible printed circuit board (FPC) or a rigid-flex board.

In one embodiment, the multiplexer 15 may be a thin-film filter (TFF) or an arrayed waveguide grating (AWG).

In one embodiment, when the multiplexer 15 is a thin-film filter, an incident surface of the multiplexer 15 is provided with a plurality of optical filter films 151 corresponding to the plurality of light-emitting chips 141, and an emitting surface of the multiplexer 15 is provided with a reflective film 152 and a light outlet 153. The light beams emitted by the plurality of light-emitting chips 141 enter the multiplexer 15 through the plurality of optical filter films 151, and then are reflected by the reflective film 152 to be combined into one light beam output from the light outlet 153.

Figure 5:
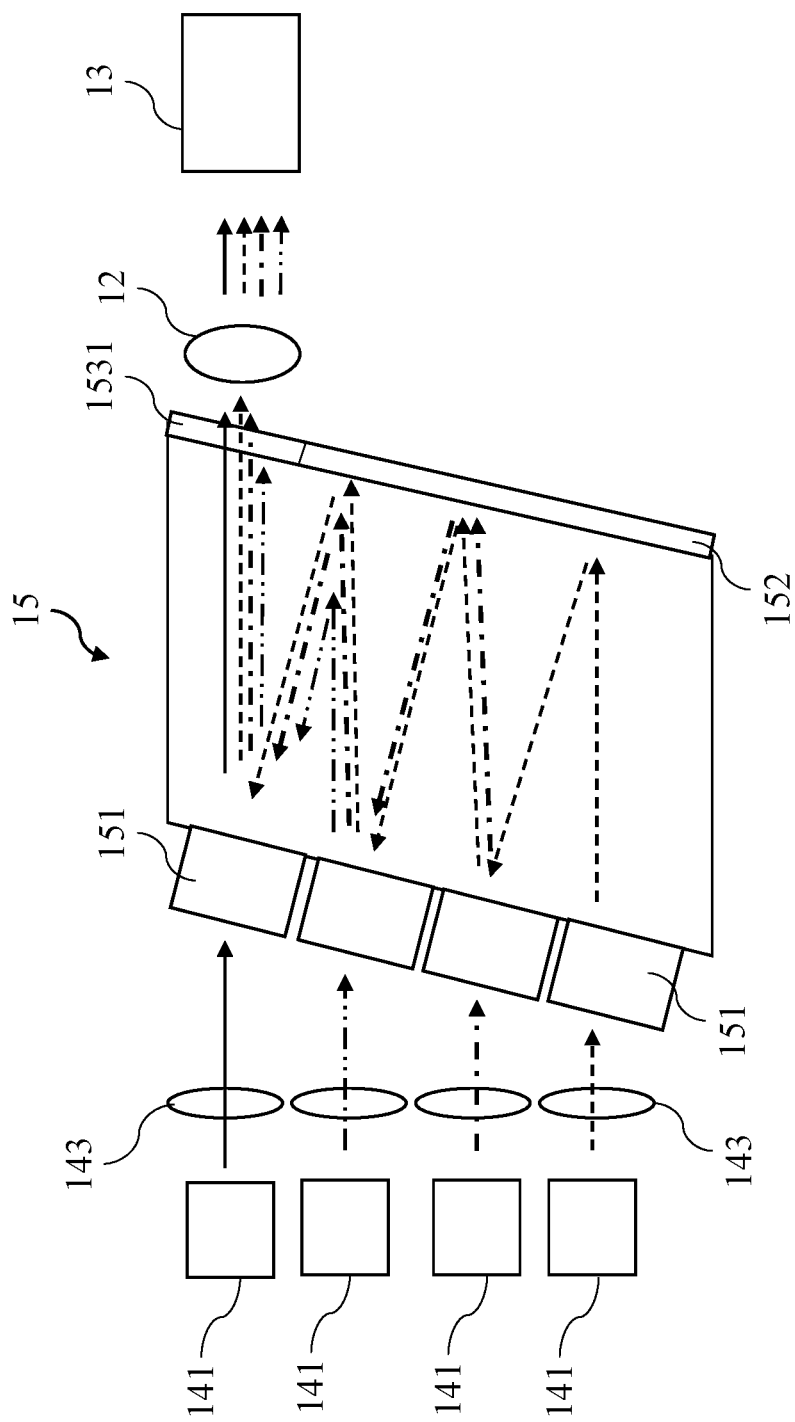
FIG. 5 is a schematic bottom view of optical paths of the optical emission assembly of FIG. 2.

Specifically, please refer to FIG. 5, which is a schematic bottom view of optical paths of the optical emission assembly of FIG. 2. As shown in FIG. 5, the optical filter film 151 is a band-pass filter film, which is configured to allow the light beams with the specific wavelength emitted by the corresponding light-emitting chip 141 to pass through, and reflect light beams with other wavelengths. The light beam emitted by some of the light-emitting chips 141 (that is, the uppermost light-emitting chip 141 in FIG. 5) and entering the multiplexer 15 through the corresponding optical filter film 151 can pass through the light outlet 153 in a straight line, and then is incident on the converging lens 12. The light beams emitted by other light-emitting chips 141 in the light-emitting chips 141 (that is, the upper second light-emitting chip 141 to the fourth light-emitting chip 141 in FIG. 5) enter the multiplexer 15, and then are reflected by the reflective film 152 and the non-corresponding optical filter films 151, so as to combine with the light beams emitted from the uppermost light-emitting chip 141 in FIG. 5 and entering the multiplexer 15 through the corresponding optical filter film 151, to form the one light beam output from the light outlet 153. The light outlet 153 can be provided with an anti-reflection film 1531 to increase the transmittance of the one light beam output from the light outlet 153.

Figure 6:
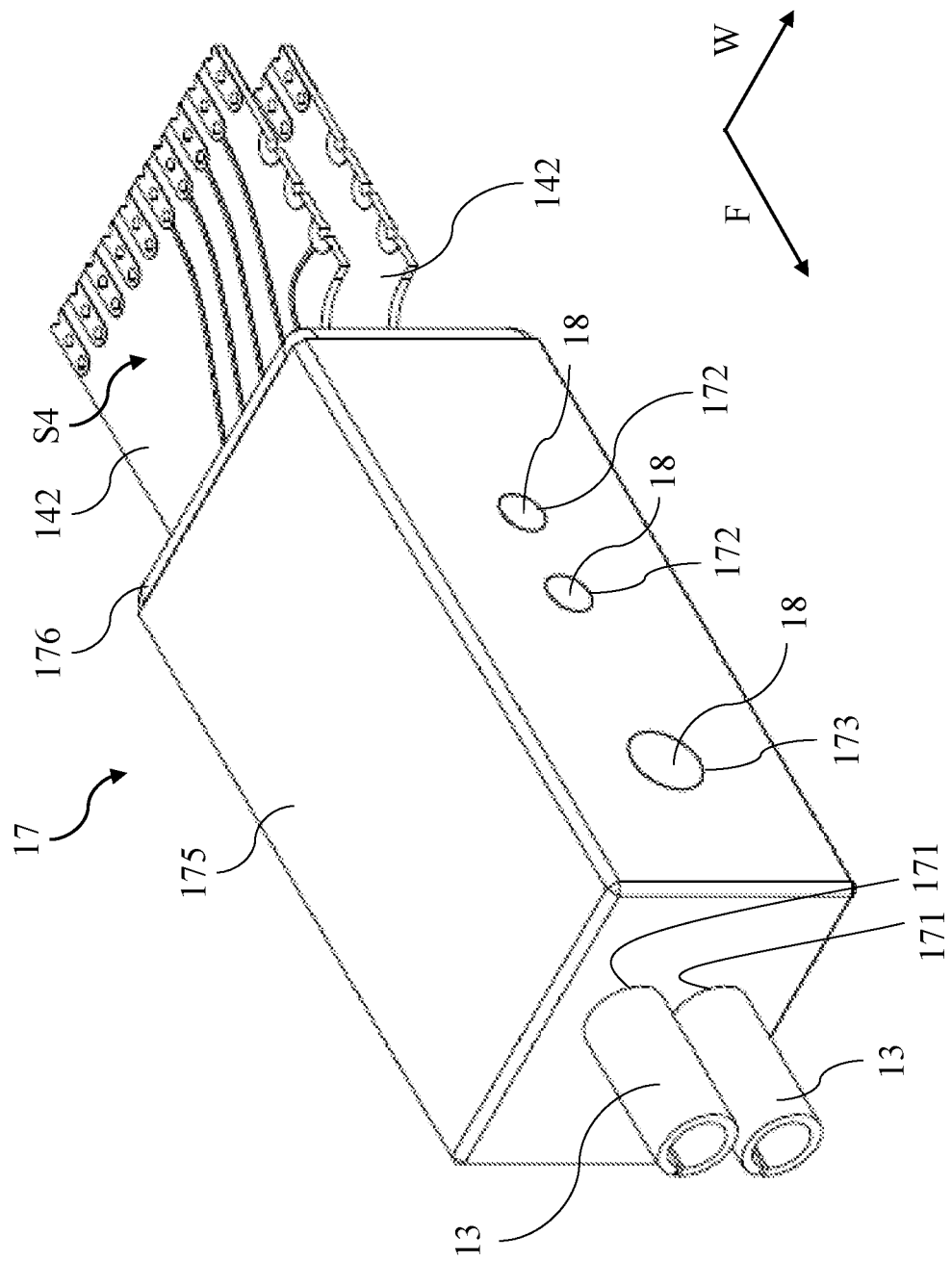
FIG. 6 is a schematic stereoscopic diagram of an optical emission assembly according to another embodiment of the present disclosure.
Figure 7:
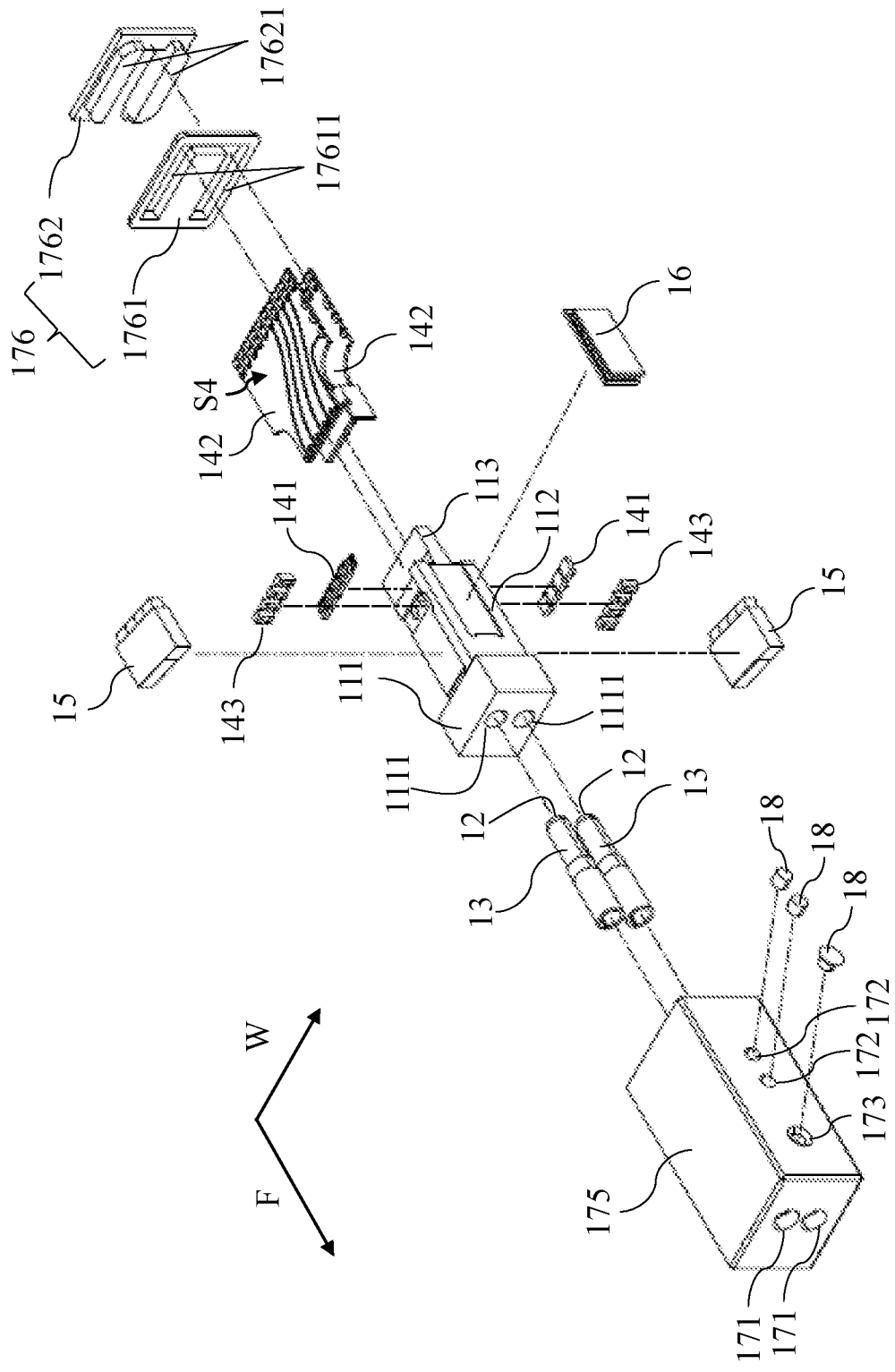
FIG. 7 is a schematic exploded diagram of a first viewing angle of the optical emission assembly of FIG. 6.
Figure 8:
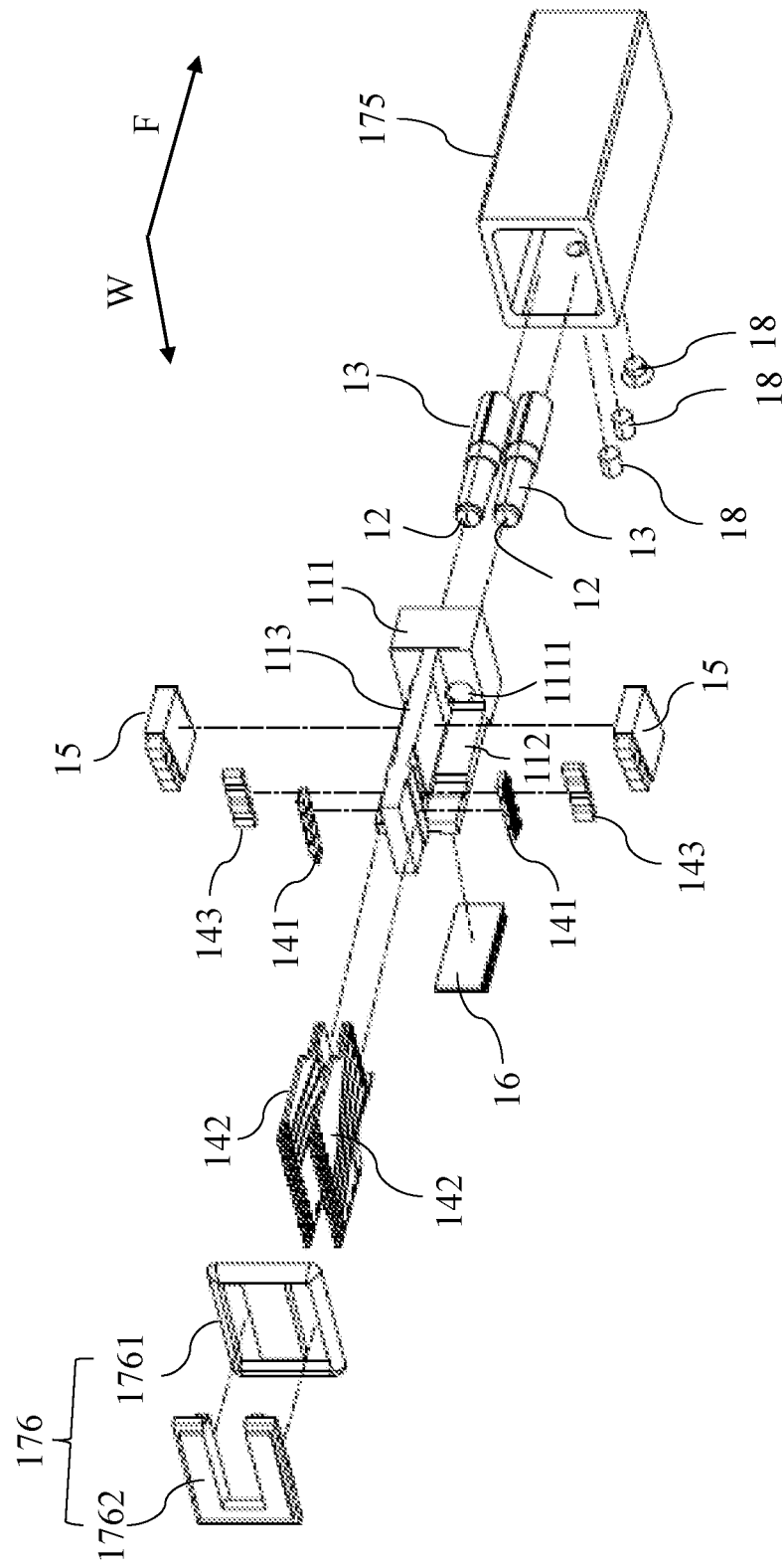
FIG. 8 is a schematic exploded diagram of a second viewing angle of the optical emission assembly of FIG. 6.

Please refer to FIG. 6 to FIG. 8, wherein FIG. 6 is a schematic stereoscopic diagram of an optical emission assembly according to another embodiment of the present disclosure, FIG. 7 is a schematic exploded diagram of a first viewing angle of the optical emission assembly of FIG. 6, and FIG. 8 is a schematic exploded diagram of a second viewing angle of the optical emission assembly of FIG. 6. As shown in FIG. 6 to FIG. 8, the difference between the optical emission assembly 2 in FIG. 6 and the optical emission assembly 1 in FIG. 2 is that the first heat dissipation plate 112 and the second heat dissipation plate 113 in FIG. 6 form a T-shaped structure, there are two light-emitting assemblies 14, two converging lenses 12, two adapters 13, two multiplexers 15, two through holes 1111 of the heat dissipation body 111, two first through holes 171, and two openings along the first direction F of the heat-conducting housing 17 (that is, the opening where the circuit board 142 extends out of heat-conducting housing 17) disposed correspondingly, and the two light-emitting assemblies 14, the two converging lenses 12, the two adapters 13, the two through holes 1111 and the two multiplexers 15 are symmetrically disposed with respect to the second heat dissipation plate 113. Specifically, the optical emission assembly 2 of FIG. 6 comprises two sets of optical paths; one light-emitting assembly 14, one converging lens 12, one adapter 13, one multiplexer 15, one through hole 1111 of the heat dissipation body 111, one first through hole 171 of the heat-conducting housing 17, and one opening where one circuit board 142 extends out of the heat-conducting housing 17 are disposed for one set of optical paths, and the two sets of optical paths are carried out with the second heat dissipation plate 113 as a plane of symmetry. That is to say, through the design of the T-shaped structure formed by the first heat dissipation plate 112 and the second heat dissipation plate 113, the optical emission assembly 2 can comprise two sets of optical paths symmetrically arranged. Compared with the optical emission assembly 1 of FIG. 2, there is a set of optical paths added in the optical emission assembly 2, which also increases the output transmission capacity of the optical emission assembly 2. Besides, the heat energy generated by the two light-emitting assemblies 14 can be dissipated through the second heat dissipation plate 113, the first heat dissipation plate 112, the cooling chip 16 and the heat-conducting housing 17, so as to solve the heat dissipation problem existing in the prior art.

Figure 9:
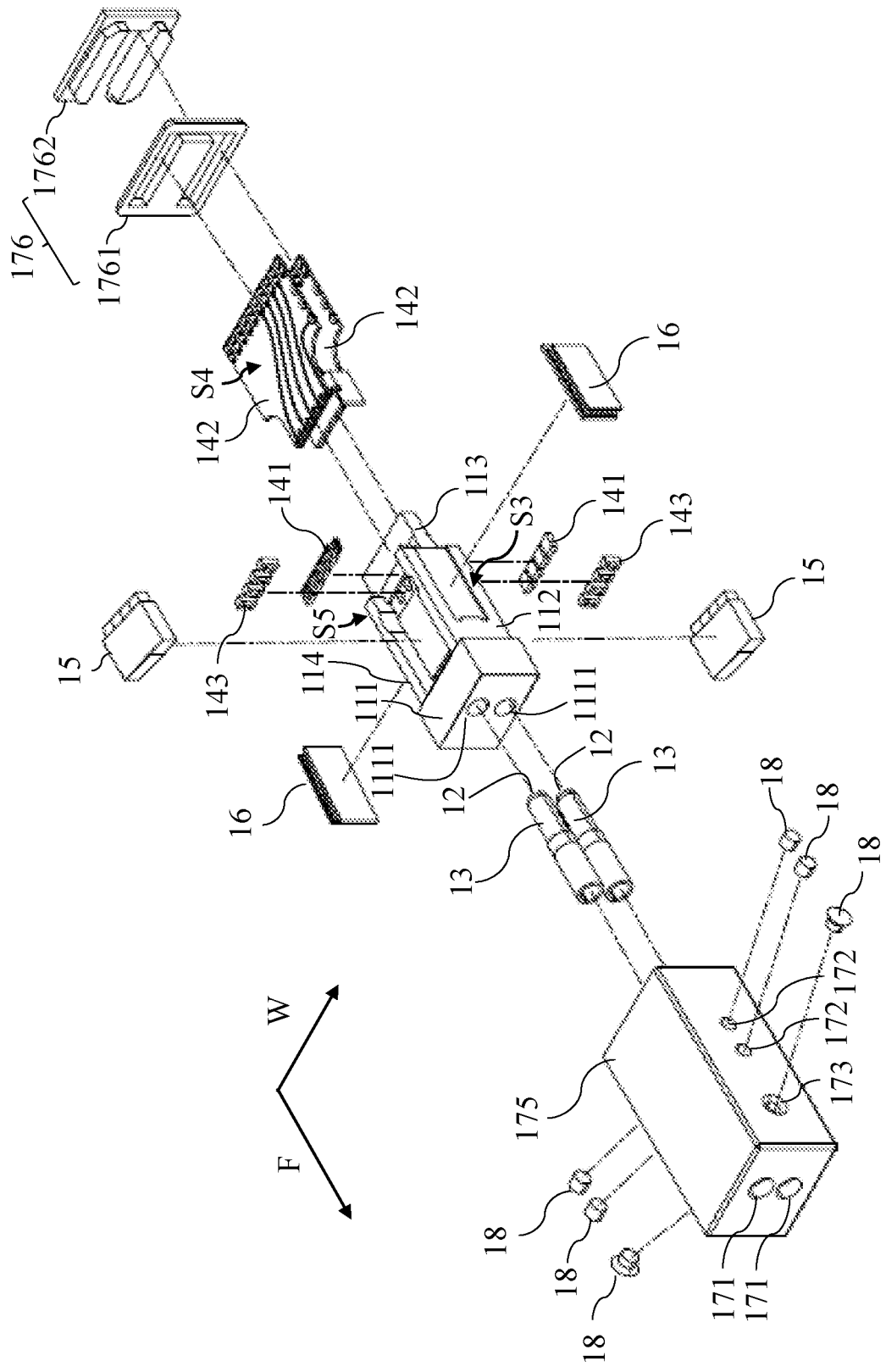
FIG. 9 is a schematic exploded diagram of a first viewing angle of an optical emission assembly according to an embodiment of the present disclosure.
Figure 10:
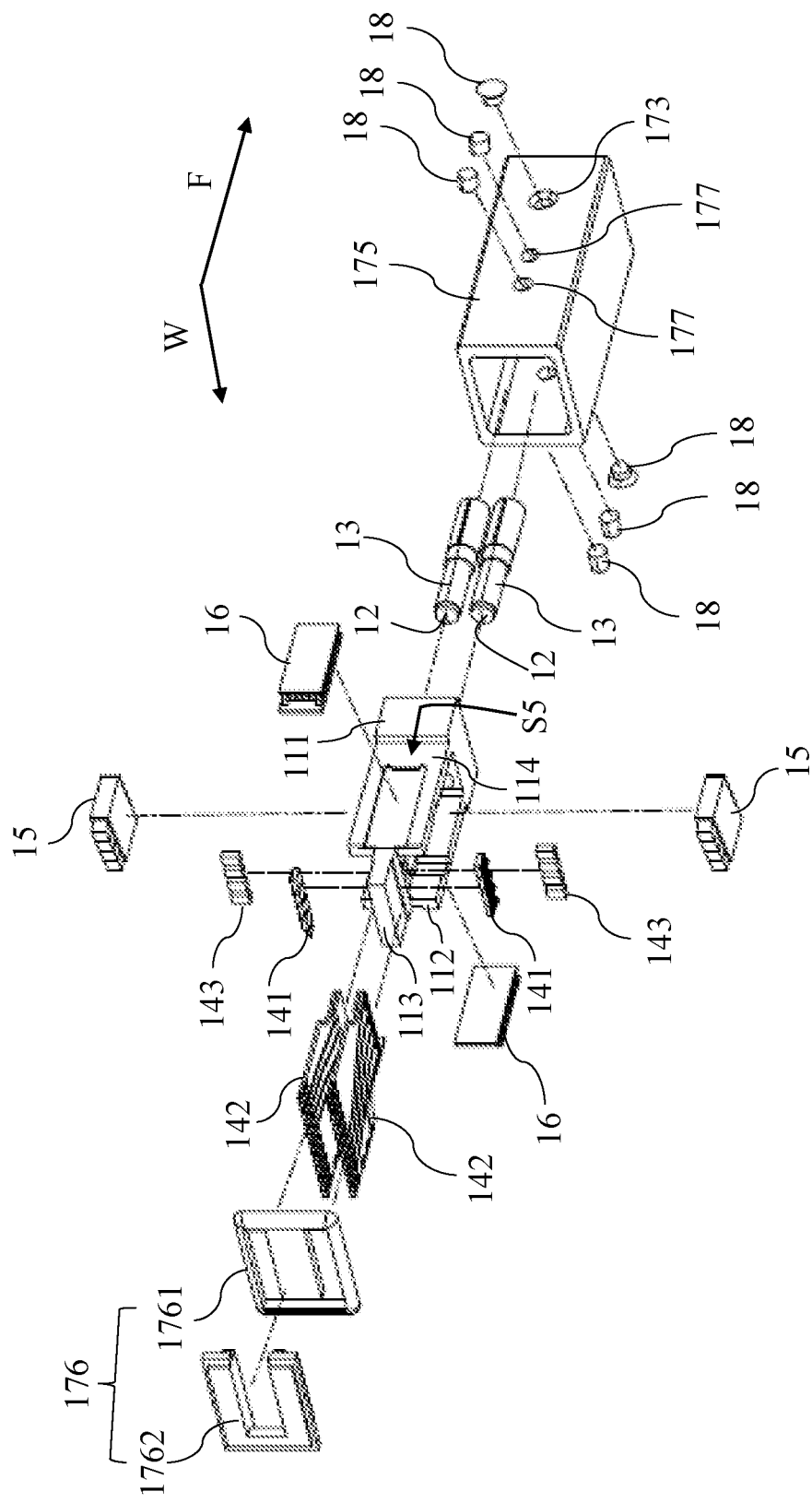
FIG. 10 is a schematic exploded diagram of a second viewing angle of the optical emission assembly of FIG. 9.

In one embodiment, the optical emission assembly 2 may further comprise a third heat dissipation plate 114 extending from the heat dissipation body 111 along the first direction F and disposed parallel to the first heat dissipation plate 112, and another cooling chip 16. The first heat dissipation plate 112, the second heat dissipation plate 113 and the third heat dissipation plate 114 form an H-shaped structure, and the another cooling chip 16 is disposed on the surface S5 of the third heat dissipation plate 114 opposite to another surface of the third heat dissipation plate 114 connected to the second heat dissipation plate 113. The heat-conducting housing 17 is also provided with a fourth through hole 177, and the another cooling chip 16 is disposed corresponding to the fourth through hole 177. The heat-conducting glue 18 is further filled in the fourth through hole 177 and between the another cooling chip 16 and the heat-conducting housing 17, so that the another cooling chip 16 is thermally connected to the heat-conducting housing 17, as shown in FIG. 9 and FIG. 10, wherein FIG. 9 is a schematic exploded diagram of a first viewing angle of an optical emission assembly according to an embodiment of the present disclosure, and FIG. 10 is a schematic exploded diagram of a second viewing angle of the optical emission assembly of FIG. 9. In addition, the heat-conducting housing 17 can further be provided with two third through holes 173, and the heat dissipation body 111 is disposed corresponding to the two third through holes 173. The heat-conducting glue 18 can further be filled in the two third through holes 173 and between the heat dissipation body 111 and the heat-conducting housing 17, so that the heat dissipation body 111 is thermally connected to the heat-conducting housing 17. The H-shaped structure is formed by the first heat dissipation plate 112, the second heat dissipation plate 113 and the third heat dissipation plate 114, the cooling chip 16 is disposed on the surface S3 of the first heat dissipation plate 112 and thermally connected to the heat-conducting housing 17, and the another cooling chip 16 is disposed on the surface S5 of the third heat dissipation plate 114 and thermally connected to the heat-conducting housing 17, so that there are two heat dissipation paths in the optical emission assembly 2 (i.e., heat dissipation through two cooling chips 16), which can disperse heat conduction and improve heat dissipation efficiency.

Figure 11:
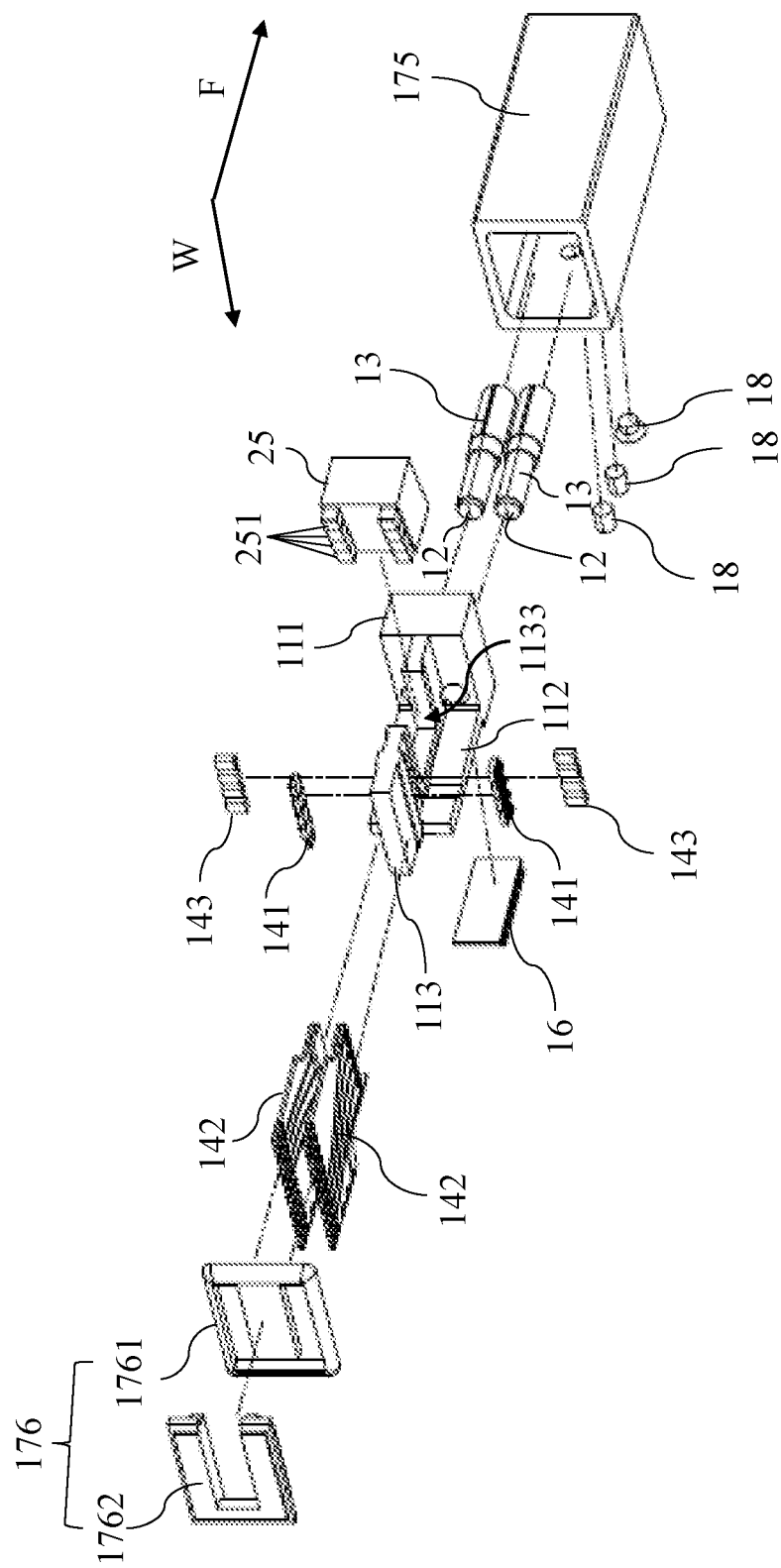
FIG. 11 is a schematic exploded diagram of a first viewing angle of an optical emission assembly according to another embodiment of the present disclosure.
Figure 12:
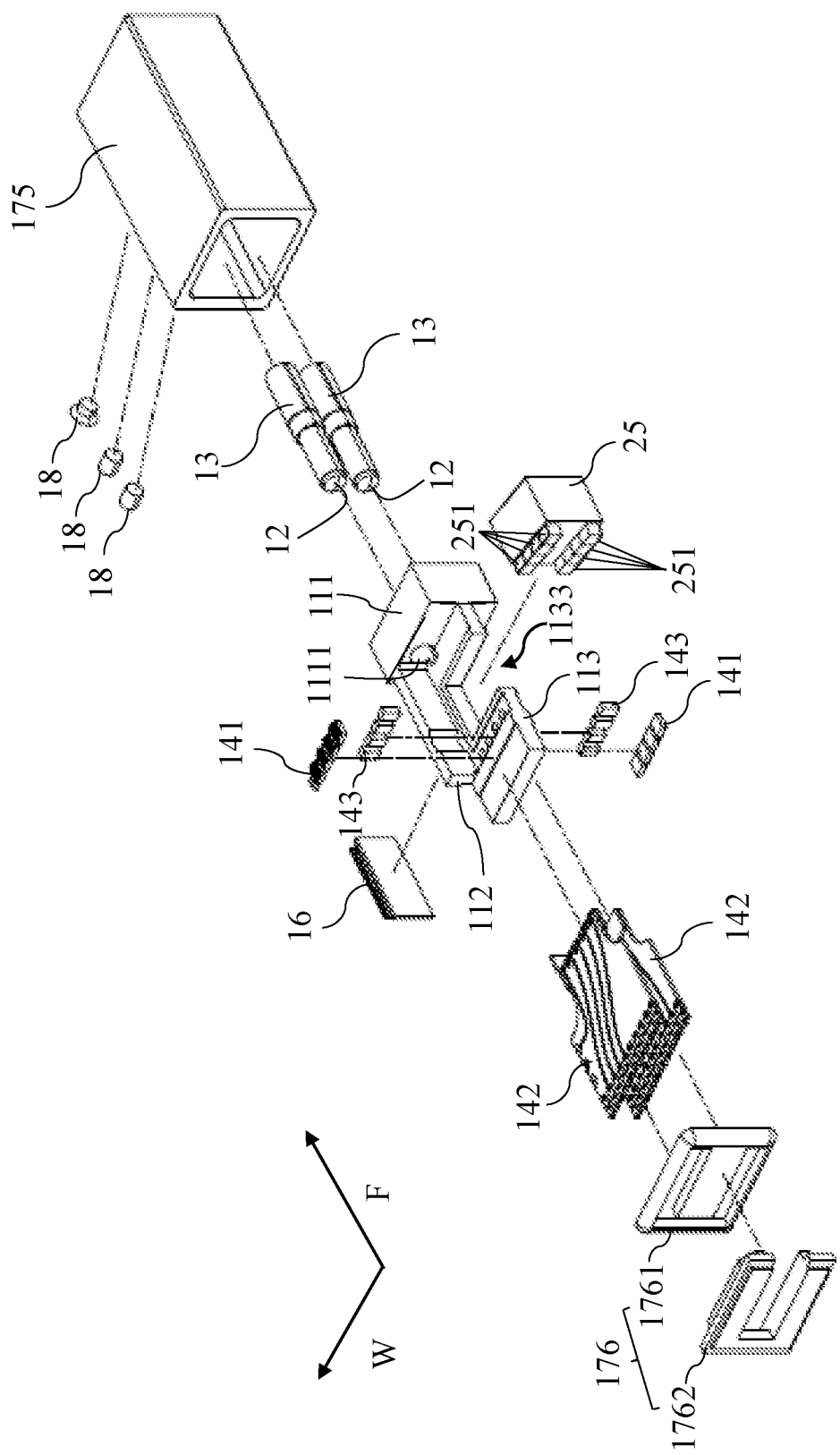
FIG. 12 is a schematic exploded diagram of a second viewing angle of the optical emission assembly of FIG. 11.

Please refer to FIG. 11 and FIG. 12, wherein FIG. 11 is a schematic exploded diagram of a first viewing angle of an optical emission assembly according to another embodiment of the present disclosure, and FIG. 12 is a schematic exploded diagram of a second viewing angle of the optical emission assembly of FIG. 11. As shown in FIG. 11 and FIG. 12, the difference between the optical emission assembly 3 of FIG. 11 and the optical emission assembly 2 of FIG. 6 is that the optical emission assembly 2 of FIG. 6 comprises two multiplexers 15, while the optical emission assembly 3 of FIG. 11 only comprises a single multiplexer 25, and the multiplexer 25 is further disposed symmetrically with respect to the second heat dissipation plate 113 (that is, the two multiplexers 15 are integrated into one multiplexer 25). The second heat dissipation plate 113 is provided with a gap 1133, and the multiplexer 25 is disposed in the gap 1133 and fixedly connected to the second heat dissipation plate 113. The multiplexer 25 is further configured to combine the light beams emitted by the plurality of light-emitting chips 141 of each light-emitting assembly 14 into the one light beam, and make the one light beam converge to the adapter 13 corresponding thereto through the converging lens 12 corresponding thereto.

Figure 13:
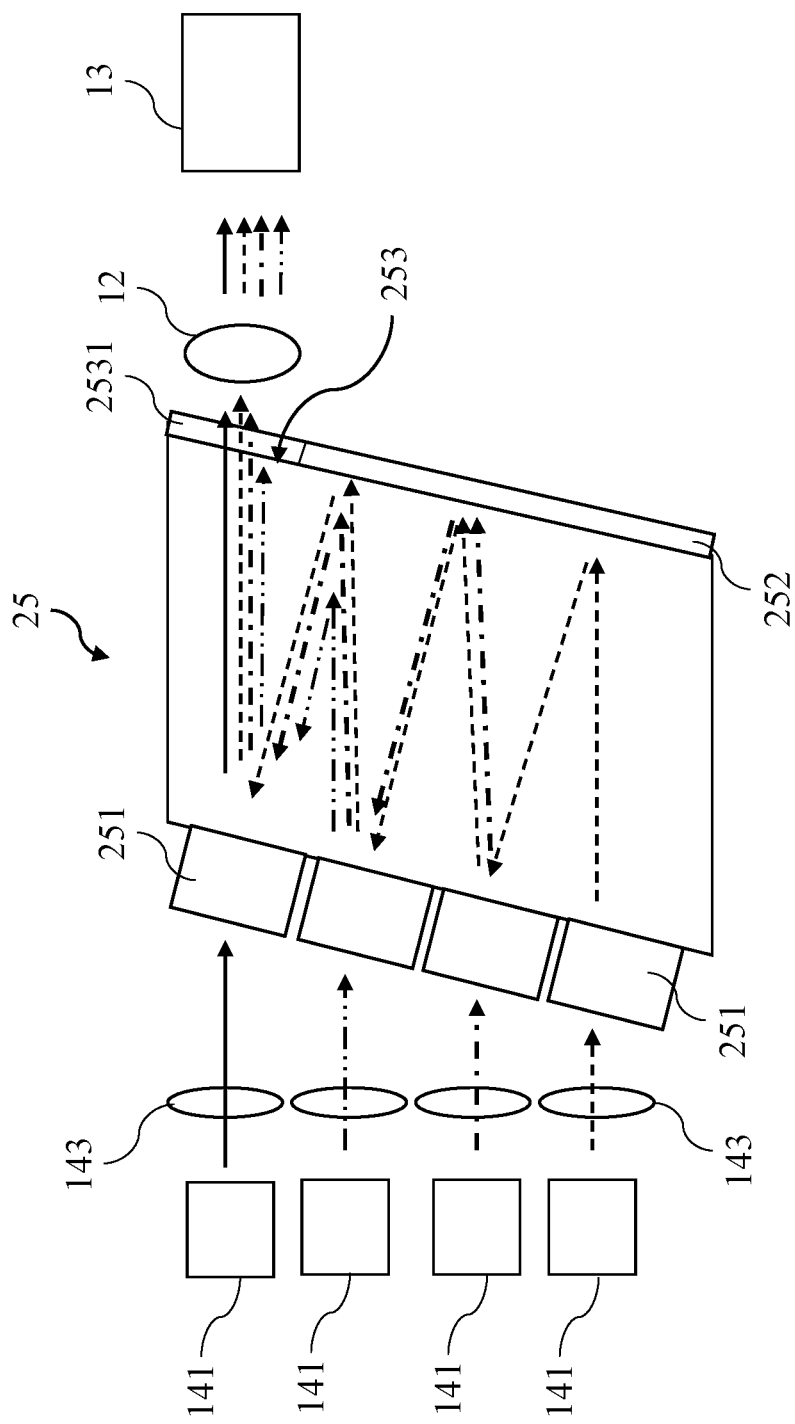
FIG. 13 is a schematic bottom view of optical paths of the optical emission assembly of FIG. 11.
Figure 14:
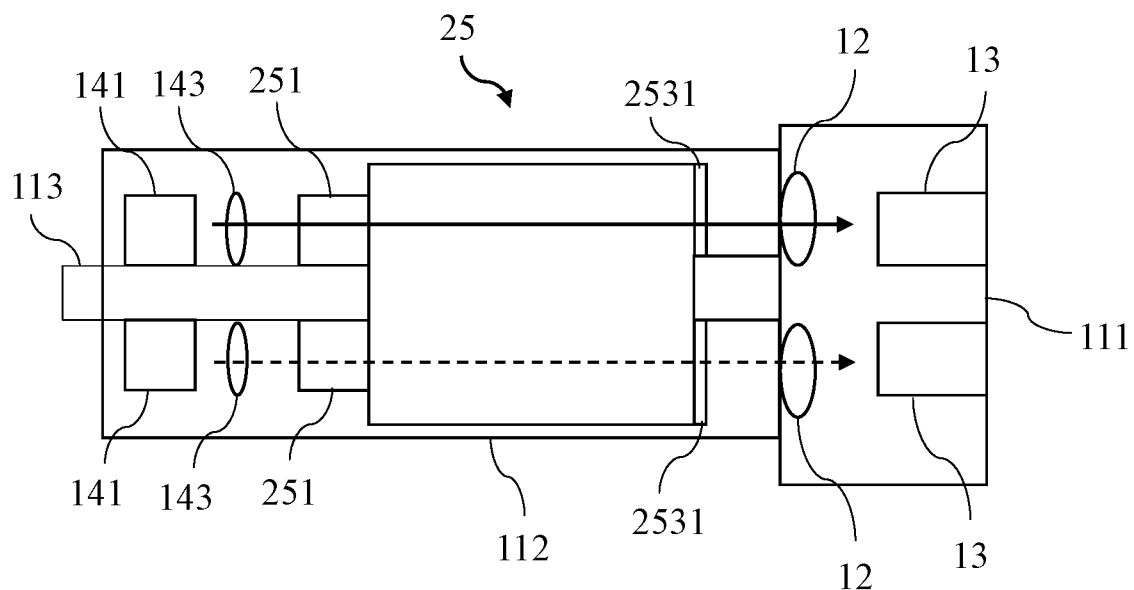
FIG. 14 is a schematic side view of the optical path of the optical emission assembly of FIG. 11.

Please refer to FIG. 11 to FIG. 14, wherein FIG. 13 is a schematic bottom view of optical paths of the optical emission assembly of FIG. 11, and FIG. 14 is a schematic side view of the optical path of the optical emission assembly of FIG. 11. As shown in FIG. 11 to FIG. 14, when the multiplexer 25 is a thin-film filter, the incident surface of the multiplexer 25 is symmetrically provided with a plurality of optical filter films 251 corresponding to the plurality of light-emitting chips 141 of each light-emitting component 14 with respect to the second heat dissipation plate 113, and the emitting surface of the multiplexer 25 is symmetrically provided with a reflective film 252 and a light outlet 253 corresponding to each light-emitting assembly 14 with respect to the second heat dissipation plate 113. The light beams emitted by the plurality of light-emitting chips 141 of each light-emitting assembly 14 enter the multiplexer 25 through the corresponding plurality of optical filter films 251, and then are reflected by the corresponding reflective film 252 to be combined into one light beam output from the corresponding light outlet 253.

Specifically, the optical filter film 251 is a band-pass filter film, which is configured to allow the light beams with specific wavelength emitted by the corresponding light-emitting chip 141 to pass through, and reflect the light beams with other wavelengths. Since there are two sets of optical paths symmetrically arranged, FIG. 13 is a schematic diagram of the optical path of the upper light-emitting assembly 14 in FIG. 14. In FIG. 13, the light beams emitted by some of the light-emitting chips 141 (i.e., the uppermost light-emitting chip 141 in FIG. 13) and entering the multiplexer 25 through the corresponding optical filter film 251 can pass through the corresponding light outlet 253 in a straight line and then is incident on the corresponding converging lens 12, and the light beams emitted by other light-emitting chips 141 among the plurality of light-emitting chips 141 (that is, the upper second light-emitting chip 141 to the fourth light-emitting chip 141 in FIG. 13) enter the multiplexer 25, and then are reflected by the corresponding reflective film 252 and the non-corresponding optical filter films 251, so as to combine with the light beams emitted by the uppermost light-emitting chip 141 in FIG. 13 and entering the multiplexer 25 through the corresponding optical filter film 251, to form the one light beam output from the corresponding light outlet 253. The light outlet 253 can be provided with an anti-reflection film 2531 to increase the transmittance of the one light beam output from the light outlet 253. It should be noted that since the multiplexer 25 is symmetrically disposed with respect to the second heat dissipation plate 113, and the light beams emitted by each light-emitting chip 141 firstly pass through the corresponding collimator lens 143 and then enter the multiplexer 25, the light beams emitted by different light emitting chips 14 do not interfere with each other (that is, the light beams emitted by the upper light-emitting assembly 14 in FIG. 14 only pass through the corresponding converging lenses 12 and then are incident on the upper half of the corresponding multiplexer 25, and the light beams emitted by the lower light-emitting assembly 14 in FIG. 14 only pass through the corresponding converging lenses 12 and then are incident on the lower half of the corresponding multiplexer 25).

Figure 15:
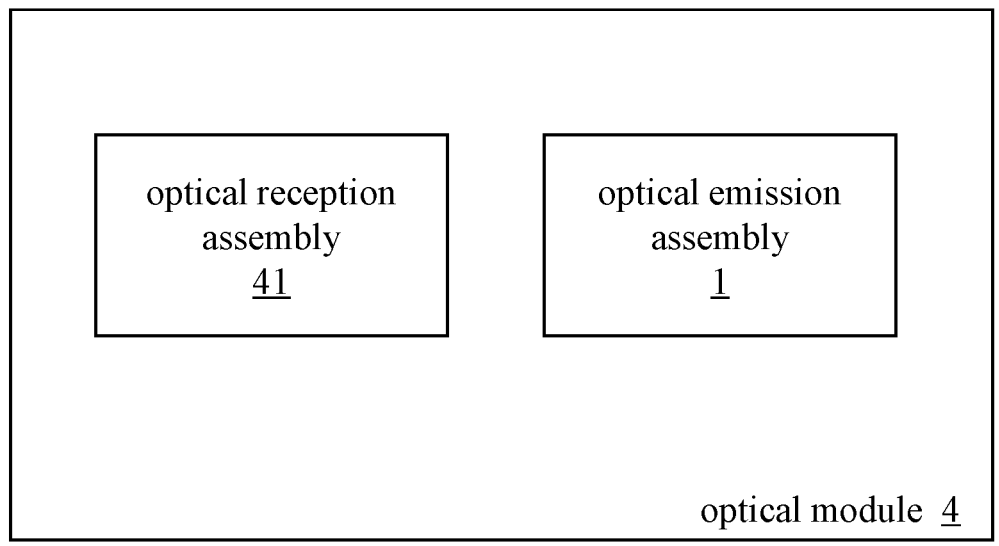
FIG. 15 is a schematic structural diagram of an optical module according to an embodiment of the present disclosure.

Please refer to FIG. 15, which is a schematic structural diagram of an optical module according to an embodiment of the present disclosure. As shown in FIG. 15, an optical module 4 may comprise an optical reception assembly 41 and an optical emission assembly 1. It should be noted that the optical module 4 may further comprise other necessary components such as a heat-conducting casing (not shown), an electrical interface circuit, and the cooling chip 16 can be thermally connected to the heat-conducting casing through the heat-conducting housing 17 to help the plurality of light-emitting chips 141 of the optical emission assembly 1 dissipate heat, which will not be described here.

In summary, in the optical emission assembly of the present disclosure, the first heat dissipation plate and the second heat dissipation plate form the T-shaped structure or the L-shaped structure, the light-emitting chips and devices associated with the optical paths of the light-emitting chips are disposed on the second heat dissipation plate, and the cooling chip is disposed on a surface of the first heat dissipation plate opposite to the surface of the first heat dissipation plate connected to the second heat dissipation plate, so that the heat energy generated by multiple light-emitting chips disposed on the same plane can be effectively dissipated by the cooling chip on the heat dissipation base through the heat-conducting housing. In addition, through the design of the T-shaped structure formed by the first heat dissipation plate and the second heat dissipation plate, the optical emission assembly comprises two sets of optical paths symmetrically arranged, which increases the output transmission capacity of the optical emission assembly. Besides, the first heat dissipation plat, the second heat dissipation plate and the third heat dissipation plate form the H-shaped structure, the cooling chip is disposed on the surface of the first heat dissipation plate and thermally connected to the heat-conducting housing, and the another cooling chip is disposed on the surface of the third heat dissipation plate and thermally connected to the heat-conducting housing, so that there are two heat dissipation paths in the optical emission assembly (i.e., heat dissipation through two cooling chips), which can disperse heat conduction and improve heat dissipation efficiency.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:
1. An optical emission assembly, comprising:
a heat dissipation base comprising a heat dissipation body, and a first heat dissipation plate and a second heat dissipation plate extending from the heat dissipation body along a first direction, the first heat dissipation plate and the second heat dissipation plate forming a T-shaped structure or an L-shaped structure, two adjacent sides of the second heat dissipation plate being respectively connected to a surface of the heat dissipation body and a surface of the first heat dissipation plate, and the heat dissipation body being provided with a through hole along the first direction;
a converging lens disposed in the through hole of the heat dissipation body;
an adapter, one end of the adapter being inserted into the through hole of the heat dissipation body;
a light-emitting assembly disposed on the second heat dissipation plate and comprising a plurality of light-emitting chips;

a multiplexer disposed on the second heat dissipation plate, located between the plurality of light-emitting chips and the converging lens, and configured to combine light beams emitted by the plurality of light-emitting chips into one light beam, and make the one light beam converge to the adapter through the converging lens;

a cooling chip disposed on a surface of the first heat dissipation plate opposite to the surface of the first heat dissipation plate connected to the second heat dissipation plate;

a heat-conducting housing, one end of the heat-conducting housing being provided with a first through hole along the first direction and a second through hole along a second direction, the first direction and the second direction being perpendicular to each other; wherein the heat dissipation base, the plurality of light-emitting chips, the multiplexer and the cooling chip are disposed in the heat-conducting housing, the adapter extends out of the heat-conducting housing through the first through hole, and the cooling chip is disposed corresponding to the second through hole; and a heat-conducting glue filled in the second through hole and between the cooling chip and the heat-conducting housing, so as to make the cooling chip thermally connect to the heat-conducting housing.

2. The optical emission assembly according to claim 1, wherein the adapter comprises a sleeve, the converging lens is disposed in the sleeve, and the sleeve is inserted into the through hole of the heat dissipation body.

3. The optical emission assembly according to claim 1, wherein the light-emitting assembly further comprises a circuit board, the circuit board is electrically connected to the plurality of light-emitting chips and extends toward the first direction; the other end of the heat-conducting housing is provided with an opening along the first direction, and the circuit board extends out of the heat-conducting housing through the opening.

4. The optical emission assembly according to claim 3, wherein the heat-conducting housing comprises a hood body and a cover body, the cover body covers an opening of the hood body to form an accommodation space; the heat dissipation base, the plurality of light-emitting chips, the multiplexer and the cooling chip are disposed in the accommodation space; the cover body is provided with the opening along the first direction, and the hood body is provided with the first through hole and the second through hole.

5. The optical emission assembly according to claim 3, wherein the second heat dissipation plate is provided with a first carrier and a second carrier, the first carrier carries the plurality of light-emitting chips, and the second carrier carries the circuit board; a height of the first carrier is greater than a height of the second carrier, and the plurality of light-emitting chips and a surface of the circuit board electrically connected to the plurality of light-emitting chips are located at the same height.

6. The optical emission assembly according to claim 3, wherein the first heat dissipation plate and the second heat dissipation plate form the T-shaped structure, there are two light-emitting assemblies, two converging lenses, two adapters, two multiplexers, two through holes of the heat dissipation body, two first through holes, and two openings along the first direction of the heat-conducting housing disposed correspondingly, and the two light-emitting assemblies, the two converging lenses, the two adapters, the two through-holes of the heat dissipation body and the two multiplexers are symmetrically disposed with respect to the second heat dissipation plate.

7. The optical emission assembly according to claim 6, further comprising a third heat dissipation plate extending from the heat dissipation body along the first direction and disposed parallel to the first heat dissipation plate and another cooling chip, wherein the first heat dissipation plate, the second heat dissipation plate and the third heat dissipation plate form the H-shaped structure, and the another cooling chip is disposed on a surface of the third heat dissipation plate opposite to another surface of the third heat dissipation plate connected to the second heat dissipation plate; the heat-conducting housing is further provided with a fourth through hole along the second direction, and the another cooling chip is disposed corresponding to the fourth through hole; the heat-conducting glue is further filled in the fourth through hole and between the another cooling chip and the heat-conducting housing, so that the another cooling chip is thermally connected to the heat-conducting housing.

8. The optical emission assembly according to claim 3, wherein the first heat dissipation plate and the second heat dissipation plate form the T-shaped structure, there are two light-emitting assemblies, two converging lens, two adapters, two through holes of the heat dissipation body, two first through holes, and two openings along the first direction of the heat-conducting housing disposed correspondingly; the two light-emitting assemblies, the two converging lenses, the two adapters, the two through holes of the heat dissipation body and the two multiplexers are symmetrically disposed with respect to the second heat dissipation plate; the second heat dissipation plate is provided with a gap, the multiplexer is disposed in the gap and fixedly connected to the second heat dissipation plate, and the multiplexer is further configured to combine the light beams emitted by the plurality of light-emitting chips of each light-emitting assembly into the one light beam, and make the one light beam converge to the adapter corresponding thereto through the converging lens corresponding thereto.

9. The optical emission assembly according to claim 8, wherein when the multiplexer is a thin-film filter, an incident surface of the multiplexer is symmetrically provided with a plurality of optical filter films corresponding to the plurality of light-emitting chips of each light-emitting assembly with relative to the second heat dissipation plate, an emitting surface of the multiplexer is symmetrically provided with a reflective film and a light outlet corresponding to each light-emitting assembly with respect to the second heat dissipation plate; the light beams emitted by the plurality of light-emitting chips of each light-emitting assembly pass through the plurality of optical filter films corresponding thereto and enter the multiplexer, and then are reflected by the reflective film corresponding thereto to be combined into the one light beam output from the light outlet corresponding thereto.

10. The optical emission assembly according to claim 9, wherein an anti-reflection film is provided on the light outlet.

11. The optical emission assembly according to claim 1, wherein when the multiplexer is a thin-film filter, an incident surface of the multiplexer is provided with a plurality of optical filter films corresponding to the plurality of light-emitting chips, and an emitting surface of the multiplexer is provided with a reflective film and a light outlet; the light beams emitted by the plurality of light-emitting chips pass through the plurality of optical filter films and enter the multiplexer, and then are reflected by the reflective film to be combined into the one light beam output from the light outlet.

12. The optical emission assembly according to claim 11, wherein an anti-reflection film is provided on the light outlet.

13. The optical emission assembly according to claim 1, wherein the multiplexer is a thin-film filter or an arrayed waveguide grating.

14. The optical emission assembly according to claim 1, wherein the light-emitting assembly further comprises a plurality of collimating lenses disposed on the second heat dissipation plate, the plurality of light-emitting chips are disposed in one-to-one correspondence with the plurality of collimating lenses, and the light beams emitted by each light-emitting chip enter the multiplexer through the collimating lens corresponding thereto.

15. An optical module, comprising an optical reception assembly and the optical emission assembly according to claim 1.

16. The optical module according to claim 15, further comprising a heat-conducting casing, and the cooling chip is thermally connected to the heat-conducting casing through the heat-conducting housing.

17. The optical module according to claim 15, wherein the adapter comprises a sleeve, the converging lens is disposed in the sleeve, and the sleeve is inserted into the through hole of the heat dissipation body.

18. The optical module according to claim 15, wherein the light-emitting assembly further comprises a circuit board, the circuit board is electrically connected to the plurality of light-emitting chips and extends toward the first direction; the other end of the heat-conducting housing is provided with an opening along the first direction, and the circuit board extends out of the heat-conducting housing through the opening.

19. The optical module according to claim 15, wherein the multiplexer is a thin-film filter or an arrayed waveguide grating.

20. The optical module according to claim 15, wherein the light-emitting assembly further comprises a plurality of collimating lenses disposed on the second heat dissipation plate, the plurality of light-emitting chips are disposed in one-to-one correspondence with the plurality of collimating lenses, and the light beams emitted by each light-emitting chip enter the multiplexer through the collimating lens corresponding thereto.

* * * * *